Sept. 16, 1941.  McCONNELL SHANK  2,256,105
BATTERY PLATE
Filed June 7, 1938
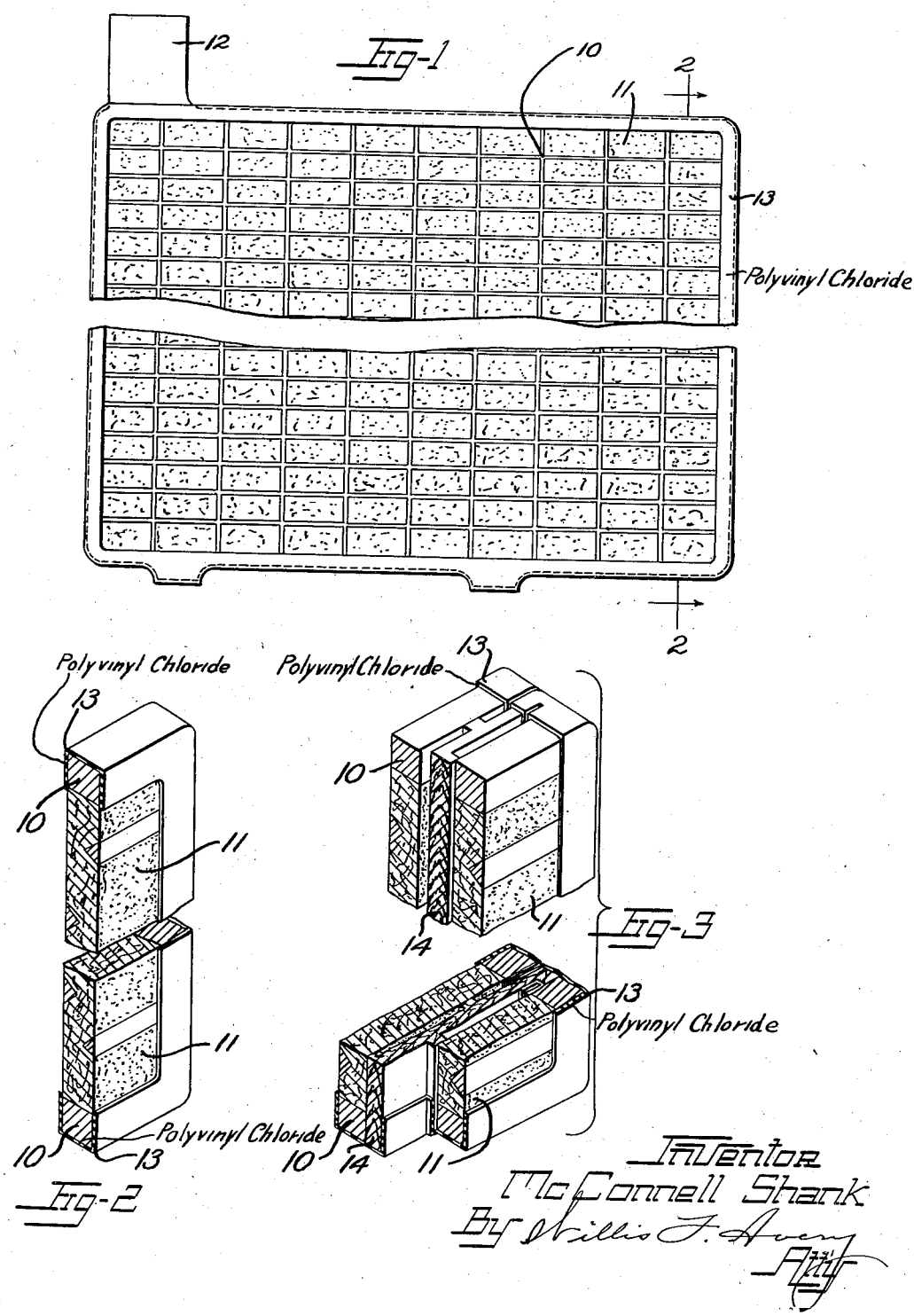

Patented Sept. 16, 1941

2,256,105

UNITED STATES PATENT OFFICE 2,256,105

BATTERY PLATE

McConnell Shank, Akron, Ohio, assignor to The B. F. Goodrich Company, New York, N. Y., a corporation of New York Application June 7, 1938, Serial No. 212,253

2 Claims. (Cl. 136—19)

This invention relates to battery plates and especially to the plates of secondary or storage batteries, and has as its object to insulate battery plates to prevent the short-circuiting which results from bridging between the edges of the plates.

Battery cells of the common lead storage batteries are ordinarily composed of a number of plates or grids separated by pieces of wood or other material. It often happens, however, that materials deposit on the edges of the plates to form a "bridge" around the separator and short-circuit the battery. This bridging most commonly occurs on the top or bottom of the plates, though a bridge may be formed at almost any place in the cell.

I have discovered that by covering one or more edges of the battery plates with a polyvinyl chloride composition, I am able effectively to prevent bridging and to prolong materially the life of the battery.

In the accompanying drawing, in which specific embodiments of this invention are shown, Fig. 1 represents a battery plate provided with the insulation of this invention;

Fig. 2 is a perspective section, partly cut away, on line 2—2 of Fig. 1; and

Fig. 3 is a perspective section of another embodiment of the invention.

Referring to the drawing, a typical battery plate 10 is provided with the pockets 11 filled with active material and the lug 12 which can be attached to a frame (not shown) to hold the plates together. The edges and margins of the plate 10 are covered with the insulating coating 13. In Fig. 3, the positive and negative plates (of which only one of each is shown) have been assembled with the separators 14 between them. The whole assemblage has then been dipped on both sides and the bottom in a solution to deposit the insulating coating 13 and join the separators to the plates.

This insulating coating 13 consists essentially of polyvinyl chloride, this material being mechanically strong, extraordinarily resistant to moisture, acids, and other corrosive materials, and having excellent dielectric properties. Though any of the several modifications of vinyl chloride polymers may be used, I prefer to use the insoluble or gamma polymer. Since gamma polyvinyl chloride is relatively hard and brittle, I usually add a plasticizer as disclosed by Semon in U. S. Patent No. 1,929,452, to increase its flexibility and resistance to mechanical shock. The preferred plasticizers are those which impart good dielectric properties to the compositions such as tricresyl phosphate, aromatic ethers and thioethers, particularly aliphatic-aromatic ethers, alkyl thianthrenes, etc. Stabilizers such as triethanol amine, lead silicate, butyl acetyl-ricinoleate, etc. are often incorporated in the compositions.

The polyvinyl chloride insulation may be applied by spraying, painting or dipping with a solution of the composition in an appropriate solvent. A typical composition contains gamma polyvinyl chloride 6.75 parts by weight, plasticizer such as tricresyl phosphate 2.25 parts, stabilizer such as triethanolamine .10 part, and solvent such as chlortoluene 90.90 parts. Each edge is dipped in this solution at about 90–100° C., the coating covering the margins of both sides for a convenient small distance. The dipping may be repeated, if desired, until an insulating coating of the desired thickness has been formed.

The solvent is then removed by heating the plate at a temperature of about 65° C. The coating is then stripped from the contact point on the lug. If desired, the lug may be protected during the dipping operation by a paper envelope which may later be removed to expose the contacting surface.

The insulating coating may be applied to positive or negative plates or both or even to the edges of the separators. When the whole series of positive or negative plates and separators is assembled and dipped as a unit, the separate parts are all joined by a strong film of insulation at the sides and bottom, making bridging nearly impossible. For most purposes, however, application of the insulating coating to the edges and margins of only the negative plates is sufficient.

In those cases in which it is preferred to treat individual plates rather than the complete assembly, the insulating coating may serve to seal the separators to the plates (or to one set of plates such as the positive plates) so that flow of current to the plate can occur only through the pores of the separators.

While I have herein disclosed specific embodiments of my invention, it will be obvious to those skilled in the art that many modifications such as varying the compositions of the insulating coating and the methods by which the coating is applied are within the spirit and scope of the invention as defined in the appended claims.

I claim:

1. A series of positive and negative battery plates joined as they are to be used in a battery with negative plates on both ends and separators between each plate, the whole assemblage having an insulating coating of plasticized gamma polyvinyl chloride on the bottom and side edges thereof.

2. A pasted lead storage battery plate having its active surfaces covered by porous insulating separators, the edges of the plate and the separators being coated with an insulating film of plasticized gamma polyvinyl chloride so that electric current can reach the plate only through pores of the separator.

McCONNELL SHANK.